US008190148B1

(12) United States Patent
Ezrol et al.

(10) Patent No.: US 8,190,148 B1
(45) Date of Patent: May 29, 2012

(54) METHOD AND APPARATUS FOR VOIP ROAMING

(75) Inventors: Gerald Ezrol, Herndon, VA (US); Brian Freeman, Farmingdale, NJ (US); Samuel Glazer, New York, NY (US); John Murray, Denville, NJ (US); Christopher W. Rice, Parsippany, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1033 days.

(21) Appl. No.: 11/240,155

(22) Filed: Sep. 30, 2005

(51) Int. Cl.
H04W 4/00 (2009.01)
H04L 12/66 (2006.01)

(52) U.S. Cl. .................... 455/432.1; 455/461; 370/352; 370/331

(58) Field of Classification Search .................. 370/352, 370/331; 455/432.1, 461
See application file for complete search history.

(56) References Cited

U.S. PATENT DOCUMENTS

| | | | |
|---|---|---|---|
| 6,144,671 A | 11/2000 | Perinpanathan et al. | |
| 6,154,839 A | 11/2000 | Arrow et al. | |
| 6,161,008 A | 12/2000 | Lee et al. | |
| 6,223,234 B1 | 4/2001 | Mahalingam | |
| 6,345,294 B1 | 2/2002 | O'Toole et al. | |
| 6,359,880 B1 | 3/2002 | Curry et al. | |
| 6,813,490 B1 * | 11/2004 | Lang et al. | 455/414.1 |
| 6,847,704 B1 * | 1/2005 | Cherchali et al. | 379/93.05 |
| 7,151,772 B1 * | 12/2006 | Kalmanek et al. | 370/390 |
| 7,221,672 B2 * | 5/2007 | Ollis et al. | 370/352 |
| 7,483,393 B2 * | 1/2009 | Wing | 370/254 |
| 2002/0163999 A1 * | 11/2002 | Farris et al. | 379/88.02 |
| 2004/0264439 A1 | 12/2004 | Doherty et al. | |
| 2006/0043164 A1 * | 3/2006 | Dowling et al. | 235/375 |

* cited by examiner

Primary Examiner — Kamran Afshar
Assistant Examiner — Omoniyi Obayanju

(57) ABSTRACT

A method and apparatus for transferring a user data profile from a user's home terminal to a visiting terminal is disclosed. User or network configuration settings are transferred from a home telephony adapter to a visiting telephony adapter. In accordance with one embodiment, a computer readable medium, such as a flash drive is inserted into the home telephony adapter and, either with or without authentication, user or network configuration settings are transferred from the home telephony adapter to the medium. In another embodiment, the medium is then inserted into the visiting telephony adapter.

2 Claims, 4 Drawing Sheets

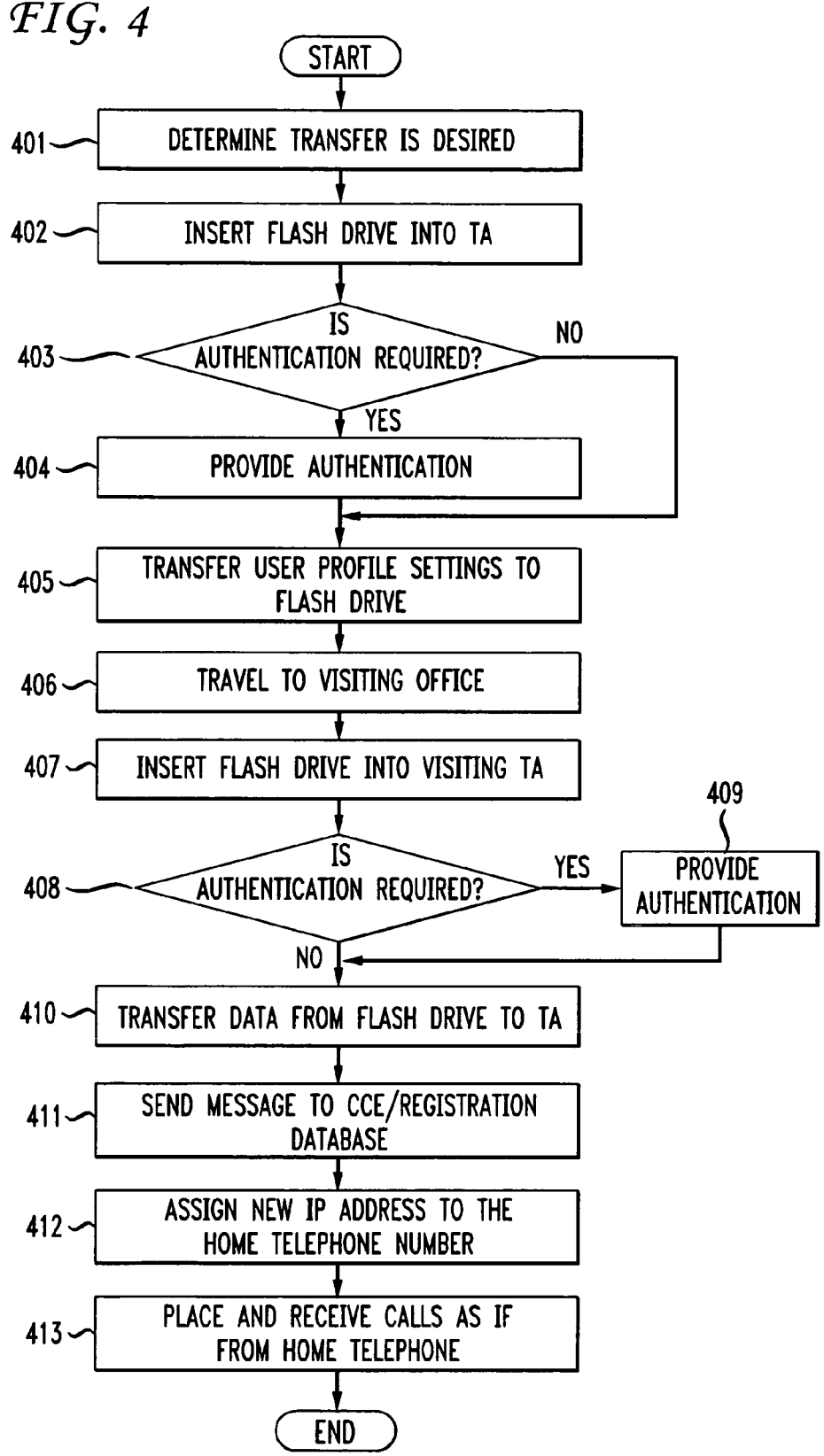

METHOD AND APPARATUS FOR VOIP ROAMING

BACKGROUND OF THE INVENTION

This invention relates generally to packet-based communications, and more particularly, to roaming techniques for voice calls across a packet switched network.

In traditional circuit based (PSTN) telephony networks, calls are established by creating a dedicated circuit between one geographic location and another location. As such, once assigned, a telephone number typically equates to an address at a physical location. In this way, a telephone number in a circuit-based network has traditionally been associated with a physical location as well as with a particular user (e.g., the home telephone number of User A, or the work telephone number of User B). When a call request for a particular number in a circuit network was received, therefore, the phone at that particular location would ring and the call would be connected.

Various methods of rerouting calls in a circuit network have been developed, such as the well-known call-forwarding service. However, these services have typically involved forwarding a call from one telephone number to another telephone number for the convenience of a recipient user. When a call is forwarded using such a service, the destination address of the call is typically altered and the call is then rerouted using the new destination address.

Roaming is a feature that is used in telephony networks to describe the ability of a user to transit across different geographic areas and still receive calls at the user's dialed number. Unlike call forwarding, which as described above involves forwarding a call from one telephone number to another telephone number, the destination number in a roaming telephone stays the same throughout the call setup process. As such, since circuit telephony networks have telephone numbers assigned to fixed geographic areas, such a roaming feature is typically not available in those networks. In fact, roaming is more typically associated with a wireless telephony network where a user of a wireless telephone is able to transit from one geographic area to another while still receiving calls directly at the telephone number associated with the wireless telephone. Such a roaming capability in wireless networks is typically facilitated by a process whereby the wireless telephone registers with the service provider network. Specifically, when the wireless telephone moves from one geographic area to another, that telephone will register with the service provider network. Thus, when a call having a dialed number of the wireless telephone is received by the service provider network, that call can be forwarded to the appropriate geographic area to facilitate call setup. One skilled in the art will recognize that such wireless roaming is transparent to both the called party and the calling party and that no special setup is required to achieve such a roaming functionality.

Placing voice calls over packet networks, such as an Internet Protocol (IP) network is becoming popular due to the potential increases in flexibility and cost savings that are available to both consumers and telecommunication service providers. Such calls are typically referred to as VoIP calls. Telecommunication service providers have developed networks to provide VoIP services that function to receive call requests from users, provide services and applications to these calls, and to then route calls to an end destination. VoIP calls may originate from either an analog or IP telephone. If an analog phone is used, it must typically be connected to a telephony adapter (TA) that converts the analog voice signals into data packets that are then forwarded to a destination in the IP network. In such an implementation, the TA will be assigned an IP address that serves as the origination address for outgoing voice packets and the destination address for incoming voice packets. Alternatively, if an IP telephone is used, it may contain internal functionality to convert the voice signals to packets, thus eliminating the requirement for a TA. In this implementation, the telephone itself is assigned an IP address that serves as the origination and destination address for outgoing and incoming voice packets, respectively.

To place a VoIP call, a user will dial a telephone number associated with a desired destination. That number is then transmitted to the service provider network where the dialed number is translated into a destination address. This translation takes place, for example, by referring to a registration database that maps telephone numbers to destination addresses such as destination IP address. Any desired services are provided to the call and a call request is then forwarded to the destination terminal in order to connect the call with the desired destination.

SUMMARY OF THE INVENTION

The present inventors have recognized that, since VoIP networks rely on IP addresses to route calls from one point to another and do not rely on a dedicated circuit to place a call, it would be desirable to be able to place calls from a visiting VoIP terminal that is different from a user's home VoIP terminal while, at the same time, retaining all the user and network preference information that would normally apply to calls placed from the user's home terminal.

Therefore, the present inventors have invented a method and apparatus in which the user settings from a user's home terminal are transferred to a visiting terminal. Specifically, in accordance with the principles of the present invention, user or network configuration settings are transferred from a home telephony adapter to a visiting telephony adapter. In accordance with one embodiment, a computer readable medium, such as a flash drive is inserted into the home telephony adapter and, either with or without authentication, user or network configuration settings are transferred from the home telephony adapter to the medium. In another embodiment, the medium is then inserted into the visiting telephony adapter These and other advantages of the invention will be apparent to those of ordinary skill in the art by reference to the following detailed description and the accompanying drawings.

DESCRIPTION OF THE DRAWING

FIG. 4 shows a flow chart of the steps performed in accordance with the principles of the present invention.

DETAILED DESCRIPTION

Figure 1:
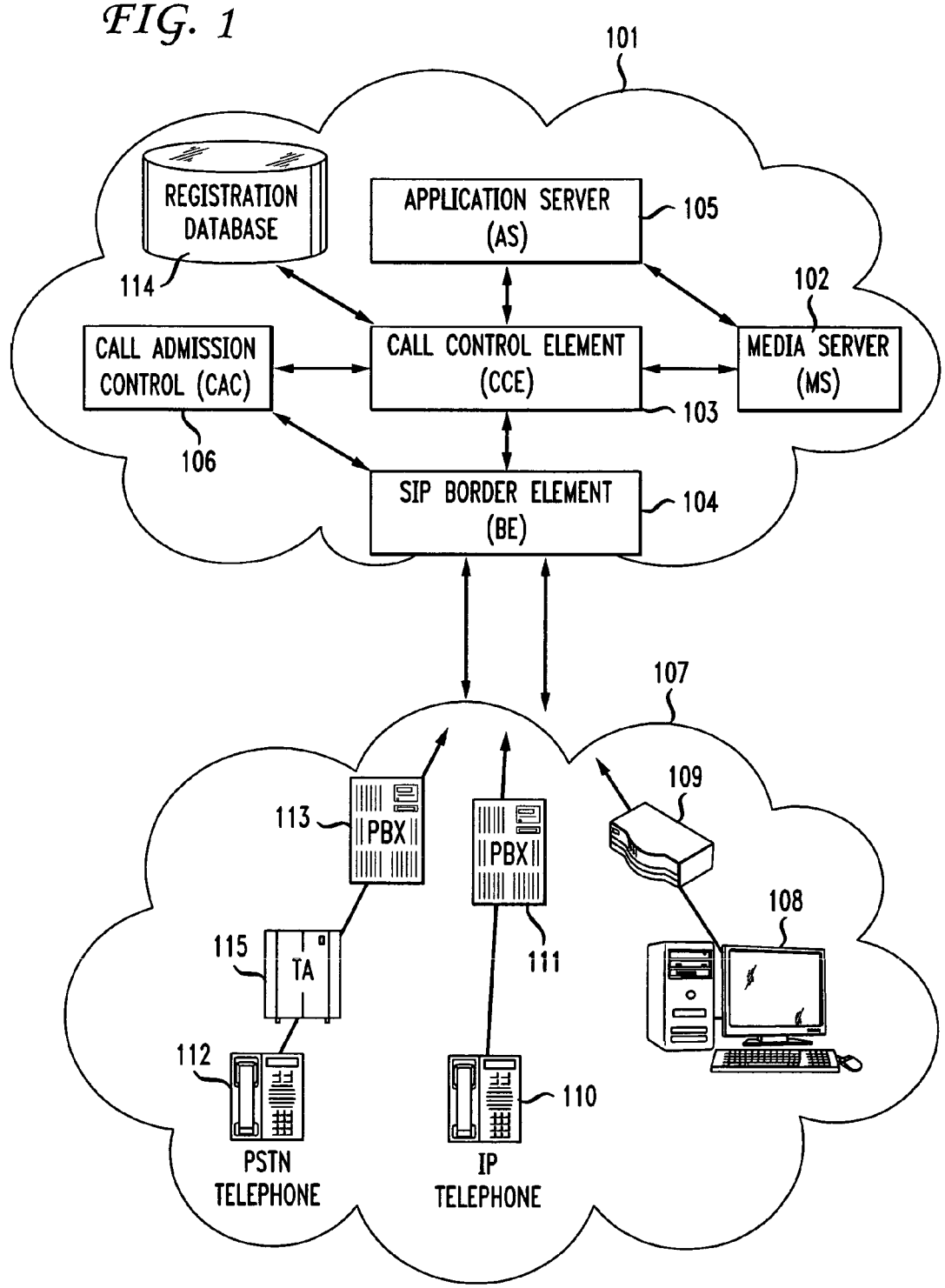
FIG. 1 shows a prior art data network for transmitting telephony signals.

FIG. 1 shows a portion of a telecommunications network, specifically an IP-based telecommunication network 101, that interfaces with one or more networks, such as illustrative customer network 107. Network 101 is, illustratively, a VoIP network operated by a telecommunications service provider that uses a specific protocol, such as the well-known session initiation protocol (SIP), as a single common internal signaling and call control protocol used by all VoIP infrastructure components within the network 101. Illustrative network 101 has call control element (CCE) 103, application server (AS) 105, call admission control server (CAC) 106 and media server (MS) 102. It may be necessary to interface network 101 with many different customer networks using many different communication protocols, such as SIP, H.323, TDM and/or any other protocol. Thus, in order to support communications to and from these networks, a gateway into network 101 for translating signals and media (e.g., calls) from one protocol to another is necessary. BE's maintain complete call state information for received requests and also perform a wide variety of other functions, including signaling, call admission control, media control and security functions.

When a BE such as BE 104 receives a request for call set-up, it then relays that request using the above functions to other network nodes, such as the CCE and CAC which then operate to dedicate resources to calls. Each terminal in a SIP network registers with a registration database 114 in the service provider network so that the telephone number corresponding of the terminal is mapped to a corresponding IP addresses. Thus, for example, when a call request arrives at the BE 104, the BE 104 will send an INVITE request to the CCE 103. When CCE 103 receives this request, it will query the registration database 114 which will return a destination IP address corresponding to the dialed number that can then be used to route the call through the IP network. One skilled in the art will recognize that this implementation is merely illustrative and that any element in network 101 may perform this registration look up function, such as BE 104, CAC 106 or any other network element.

Network 107 is, illustratively, an Internet Protocol (IP) communications network at a customer premises that has, illustratively, Public-Switched Telephone Network (PSTN) telephone 112, IP telephone 110 and computer 108. Each of these devices is connected to network 101 through network 107 using, respectively, using telephony adapter (TA) 115, PBX 113, PBX 111 and network switch 109. IP networks, such as network 107, are used to transmit information from one IP address to another IP address by encapsulating that information into IP packets that each have, for example, addressing information in a header of each packet. This header is used by switches/routers in the IP network to route the packets to the intended destination and, therefore, such networks are referred to as IP-switched networks. Such IP networks are well-known in the art and, therefore, will not be further described herein.

As is also well-known, more traditional telecommunication networks (e.g., traditional PSTN networks) did not use IP packets to transmit information and, instead, relied upon time division multiplexing (TDM) of signals in a circuit-switched method to transmit signals to a destination node. One skilled in the art will recognize that, since network 107 is an illustrative IP network, the traffic originating from PSTN telephone 112 (which is typically associated with a circuit-switched network) will require conversion to IP packets in order for the call to be transmitted over network 107. This conversion takes place at illustrative TA 115 but, as one skilled in the art will recognize, may also take place at PBX 113 or at PSTN telephone 112 itself. One skilled in the art will recognize that this conversion may also take place at any computer or network node in the path of transmission of a call from PSTN telephone 112 to network 101 through network 107.

As is well known to one skilled the art, and as discussed above, TA 115 is a device used to create a physical connection between an analog telephone and a data network, such as the Internet, so that a user can place calls over that network. A TA, illustratively, performs analog-to-digital (A/D) conversion to connect directly to a VoIP server via, for example, a broadband Internet connection such as that provided by cable or Digital Subscriber Line (DSL) access networks. One skilled in the art will also recognize that such an A/D conversion as well as the other functions of a TA may also be performed directly on a telephone, referred to herein as an IP telephone or, alternatively, may be performed by software executed on an external computer. In such cases where a computer is used to operate VoIP software in conjunction with a TA, that software functionality is typically referred to as "soft-phone" functionality.

Configuration settings associated with a local device and/or features in a service provider network may be stored at a user terminal, such as an IP telephone or a TA, and may be used during call setup to tailor the call according to a user's preferences. These configuration settings are referred to herein as a user profile. Such a user profile may include information such as the telephone number of a user's telephone or may include settings related to various features that can be applied to a call, such as caller ID, call waiting, three-way calling, or call forwarding. Additionally such user profiles may include settings related more specifically to a particular telephone, such as ring tone selection, how numbers are displayed and telephone book information. One skilled in the art will recognize that such a user profile may contain a myriad of settings that are automatically set or that are selectably chosen by a user to tailor a VoIP communication session. Such user profile settings are, for example, stored in a computer readable memory located in the TA, an IP telephone or, alternatively, a computer adapted to store such a user profile.

As discussed previously, calls made in a traditional circuit-switched network typically originated from a telephone in a fixed location and having a fixed telephone number. Therefore, while a user frequently selected various preferences to be applied to calls, such as ring tone and number of rings before answer, those preferences were usually associated with that telephone number. As a result, these preferences were only applied to calls made from or destined for the particular telephone having that number. Thus, for example, when a user attempted to make a call from another telephone having a different telephone number, those settings were not available to the user and could not be applied to a call without reconfiguring the new telephone. Many implementations of IP networks also follow this paradigm and rely on user settings selected for a telephone and/or telephone number. Thus, as in a circuit network, when users use a different phone, even if that telephone is an IP phone, the desired settings and preferences of the user are in many cases unavailable without reconfiguring the telephone to reflect those preferences.

The present invention substantially overcomes this limitation. In particular, in accordance with the principles of the present invention, a user can roam from one telephone to another in a VoIP network and make calls that have the settings of that user's home telephone and that may even appear as if the call originated from that home telephone. More particularly, in accordance with one embodiment of the present invention, a user may store user profile settings from a TA on, for example, computer readable medium and then may transfer those settings from the computer readable medium to another TA at, for example, a different geographic location. The TA then registers with the VoIP network registration database to inform the network that all configuration settings are maintained for the user and any incoming calls are routed to the second TA. In this way, a user can "roam" from one location having a first telephony adapter to a second location having a second telephony adapter while, at the same time, retaining the capability to customize a VoIP call that is tailored according to that user's previously established user profile.

Figure 2:
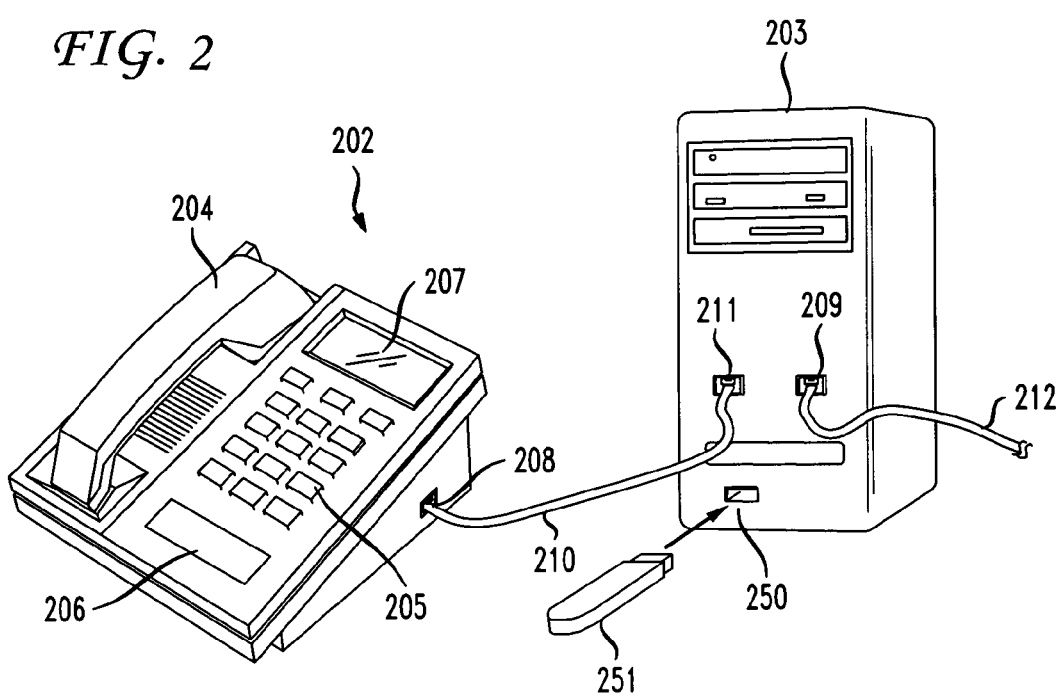
FIG. 2 shows an illustrative telephone and telephony adapter in accordance with the principles of the present invention.

FIG. 2 shows a TA and telephone capable of accommodating a transfer of data, such as user profile data, to and/or from a computer readable medium. In particular, referring to that figure, analog home telephone 202 is connected to TA 203. As discussed previously, one skilled in the art will recognize that the telephony adapter function may be integrated into a telephone, called an IP telephone, thus eliminating the need for separate telephone and TA components. Telephone 202 illustratively has handset 204, number pad 205, speaker 206 and display 207. Telephone 202 also has a line port 208, which is an illustrative RJ12 connector port, for connecting the telephone to a phone line. In this illustrative example, a well-known modular telephone cable 210 having, for example, an RJ12 connector at each end, connects the telephone to telephony adapter 203, which also has a corresponding RJ12 line port 211. One skilled in the art will recognize that many different types of port and line configurations may be used to connect telephone 202 with TA 203 and that a modular telephone cable having RJ12 connectors is merely illustrative.

In addition to line port 211, TA 203 also has a network port 209 that is adapted to be connected to a data network. Illustratively, network port 209 is a well-known RJ45 port adapted to receive an RJ45 connector connected to network cable 212, which is illustratively a cable capable of carrying well-known Ethernet traffic. This cable connects TA 203 to a data network such as, for example, the Internet. Methods of connecting to the Internet and other data networks are extremely well known. For example, such a connection can be accomplished by using a cable modem connected to cable service provider lines. In such an implementation, TA 203 may be directly connected to the cable modem or, for example, through a network switch or router that is in turn connected to the cable modem. Alternatively, TA 203 may be connected to a computer that is, in turn, connected to the Internet. One skilled in the art will appreciate the myriad of methods and architectures that can be used to connect TA 203 (or an IP telephone) to a data network. One skilled in the art will also recognize that, once again, RJ45 connectors and corresponding network cables are merely illustrative and may vary depending, for example, upon the type of access that is provided to the data network. In particular, in addition to the aforementioned cable modem access, other popular Internet access methods include Digital Subscriber Line (DSL) and direct connections to the Internet using high-speed data lines.

Referring once again to FIG. 2, TA 203 also has data port 250 that is, for example, a Universal Serial Bus (USB) port by which user profile settings may be transferred to or from the TA 203. USB ports and devices that are adapted to be connected to such ports are well known. For example, well known USB flash drives are becoming ubiquitous for transferring data to and from devices having such USB ports. Such flash drives typically consist of a USB connector coupled to magnetic computer-readable storage media in a small package that makes such flash drives convenient to carry, for example, on a user's key chain. When inserted into, for example, a USB port of a computer, such flash drives may be automatically recognized, illustratively, as a logical hard drive of the computer, thus permitting a user to transfer data to and from the flash drive. The use and operation of USB flash drives are extremely well known and, therefore, will not be further described herein.

One skilled in the art will appreciate that, while USB flash drives are ubiquitous, many other types of flash storage devices conforming to many different form factors, may used in place of USB flash drives in many applications with equally advantageous results. For example, other types of flash memory having different form factors as compared to the USB form factor include compact flash (CF), Secure Digital (SD) and MemoryStick (MS) flash memory. Each of these devices is typically capable of holding from a few kilobytes to several gigabytes of data. While each of these memory form factors requires a different-sized port to interface with a particular device, one skilled in the art will recognize that such ports could be interchanged with a USB port in a TA, as described above, and the respective type of flash memory could be used according to the principles of the present invention with equally advantageous results. One skilled in the art will also recognize that, while flash memory is specifically discussed in the embodiments herein, any type of computer readable memory could be used equally advantageously. The embodiments of the principles of the present invention described herein are intended to encompass the use of any type of computer readable media.

Regardless the type or form factor of media used, when that media is connected to a data port in a TA, such as data port 250 in FIG. 2, data can be transferred between the TA and that storage media. In particular, in one illustrative embodiment, the TA 203 may automatically recognize when USB flash drive 251 is inserted into USB port 250 in FIG. 2, and then, after any desired authentication, transfer user profile settings automatically from the TA.

Figure 3:
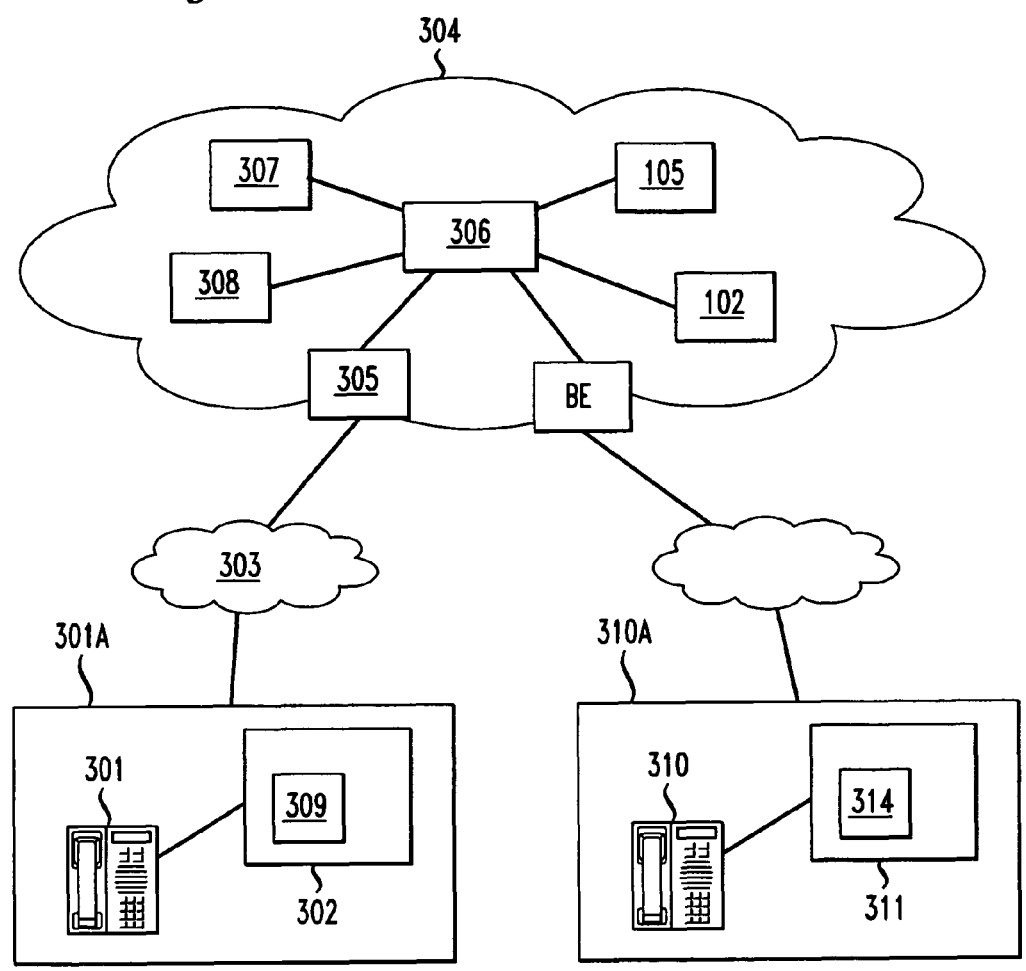
FIG. 3 shows an illustrative network having a home telephony adapter and a visiting telephony adapter.

FIG. 3 shows an illustrative network in accordance with the principles of the present invention whereby such transfers may be accomplished. In particular, in the network of FIG. 3, user profile settings data may be transferred from one TA, herein referred to as a home TA, to computer readable media. Then, that data may be transferred from the computer readable media to a second TA, herein referred to as a visiting TA. Specifically, FIG. 3 shows an office telephone 301 in an office 301A corresponding to a user. Office telephone 301 is connected to, for example, TA 302 which, in turn, accesses VoIP network 304 via access network 303, illustratively, a cable access network connected to the Internet. VoIP network 304 has, as described above, BE 305, CCE 306, registration database 307, CAC 308 and other elements such as AS 105 and MS 102. Office telephone 301 is, for example, located in the primary office 301A assigned to a user and is, therefore, referred to herein as the home telephone for that user. Similarly, the TA associated with that home telephone, specifically TA 302, is referred to herein as the home TA. As described above, home TA 302 has data port 309 that is, once again, a USB port.

FIG. 3 also shows an office telephone 310 located in another office 310A, for example, an office in a city different from office 301A. Office telephone 310 is, in such a case, referred to herein as the visiting telephone for the user. Similarly, the TA associated with that visiting telephone, specifically TA 311, is referred to herein as the visiting TA. Office telephone 310 is connected to, for example, TA 311 which, in turn, accesses VoIP network 304 via access network 313. As is the case with home TA 302, visiting TA 311 has data port 314 that is, once again, a USB port.

Assume now that the user of home telephone 301 desires to travel to office 310A and wishes to use office telephone 310 in that office. Prior to leaving office 301A to travel to office 310A, the user may determine that it is desirable to transfer user settings from the home telephone 301 to the visiting telephone 310. FIG. 4 shows a method in accordance with the principles of the present invention whereby transfers as described above may be accomplished. Specifically, at step 401, a user of a home office telephone and home TA, such as telephone 301 and TA 302 in office 301A, determines that he desires a transfer of user settings to, for example, visiting telephone 310 and visiting TA 311 in visiting office 310A. Once again, visiting office 310 may, for example, be located in a city different from home office 301. At step 402, the user inserts a memory device, such as USB flash drive 251 in FIG. 2, into a USB port, such as USB port 250, in home TA 302. One skilled in the art will once again recognize that the functionality of home TA 302 may be implemented directly into an IP telephone or, alternatively, may be implemented in a stand-alone computer. In such a case, one skilled in the art will further recognize that such an IP telephone or computer may have a port, such as a USB port, into which a memory device such as USB flash drive 251 may be inserted. Next, at step 403 it is determined whether authentication is required prior to a transfer of data to the flash drive. If not then at step 404, user profile data on TA 302 is automatically transferred to the flash drive. However, in many situations, authentication of, for example, the user's identification may be desired or required for security or other purposes. As such, if authentication is required at step 403, at step 404 authentication is provided. Such authentication may be provided by many well known methods. For example, such authentication may be provided by a user by pressing a series of buttons on a keypad of a telephone connected to TA 302. Alternatively, a password may be entered into a computer or other device connected to the TA. Once authentication has been provided, if required, then at step 405, the user profile settings are transferred to the flash drive. Next at step 406, the user travels to visiting office 310A having office telephone 310 and visiting TA 311. In order to initiate a roaming session, at step 407 the user inserts the flash drive containing user profile data into the TA 311 or telephone 310 and, at step 408, it is determined whether authentication is required. Once any necessary authentication is provided at step 409, then at step 410 the user profile data is transferred from the flash drive to the visiting TA 311. One skilled in the art will recognize that this transfer may be initiated automatically or manually by the user. At step 411, visiting TA 311 sends a registration message to the CCE and/or registration database in the VoIP network. Once the CCE/registration database receives the message, at step 412 the user's telephone number is associated with an IP address of the TA 311 so that, when any new calls arrive for the user, at step 413 they will be forwarded automatically to the visiting TA 311. Thus, all user local and network configuration settings are transferred to the visiting TA 311 and all calls destined for the user's telephone number will be directed instead to the visiting TA 311. In this way, the user can then place and receive calls as if that user was located at a home telephone location.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Other arrangements will also be obvious to those skilled in the art. For example, as discussed above, while the principles of the present invention are discussed herein in association with the wired voice networks, the principles of the present invention can be used with any method of communication. Those skilled in the art could implement various other feature combinations without departing from the scope and spirit of the invention.

The invention claimed is:

1. A method for roaming in a telephony data network,
automatically receiving, without providing authentication information, a user profile comprising data stored on a first telephony adapter, wherein the data comprises a telephone number associated with the first telephony adapter, settings related to features that can be applied to a call including caller ID settings, call waiting settings, three-way calling settings, and call forwarding settings, and settings related to a telephone associated with the first telephony adapter including ring tone selection settings, display settings, and telephone book information;
entering authentication information into a second telephony adapter;
transferring, based on the authentication information, the user profile to the second telephony adapter;
transmitting a registration message from the second telephony adapter to a call control element, the registration message comprising:
a request to associate the telephone number associated with the first telephony adapter with an internet protocol address associated with the second telephony adapter, and
authentication information;
authenticating the registration message based on the authentication information; and
associating the telephone number associated with the first telephony adapter with the internet protocol address associated with the second telephony adapter.

2. The method of claim 1 wherein the second telephony adapter is geographically separated from the first telephony adapter.

* * * * *